(12) United States Patent
Chan

(10) Patent No.: US 6,606,283 B2
(45) Date of Patent: Aug. 12, 2003

(54) LONG SEEKING METHOD USED IN AN OPTICAL DISK DRIVE

(75) Inventor: Yi-Chung Chan, Taipei (TW)

(73) Assignee: Via Technologies Inc., Hsin-Tien (TW)

(*) Notice: Subject to any disclaimer, the term of this patent is extended or adjusted under 35 U.S.C. 154(b) by 0 days.

(21) Appl. No.: 10/063,945

(22) Filed: May 28, 2002

(65) Prior Publication Data

US 2003/0031097 A1 Feb. 13, 2003

(30) Foreign Application Priority Data

Aug. 10, 2001 (TW) ...................................... 90119698 A

(51) Int. Cl.[7] .............................................. G11B 21/08
(52) U.S. Cl. ................................ 369/30.15; 369/30.17; 369/44.14
(58) Field of Search .......................... 369/30.15, 30.1, 369/30.16, 30.17, 30.13, 30.11, 30.12, 30.14, 47.28, 44.14, 13.32, 44.28

(56) References Cited

U.S. PATENT DOCUMENTS 5,822,281 A * 10/1998 Yumita .................. 369/13.32
6,229,773 B1 * 5/2001 Chou ..................... 369/44.28

* cited by examiner

Primary Examiner—Ali Neyzari
(74) Attorney, Agent, or Firm—Winston Hsu

(57) ABSTRACT

A long seeking method, used in an optical disc drive, includes identifying the position of the pick-up head, applying a first driving force on the pick-up head in addition to the velocity control force when the pick-up head is within the acceleration region, where the direction of the first driving force is the same as the moving direction of the pick-up head, and applying a second driving force on the pick-up head in addition to the velocity control force when the pick-up head is within the deceleration region where the direction of the first driving force is opposite to the moving direction of the pick-up head.

18 Claims, 14 Drawing Sheets

Seeking time : 97.463ms

LONG SEEKING METHOD USED IN AN OPTICAL DISK DRIVE

BACKGROUND OF INVENTION

1. Field of the Invention

The present invention relates to a long seeking method, and more particularly, to a long seeking method for applying additional driving forces on a sled of an optical disk drive.

2. Description of the Prior Art

In the field of designing control chipsets for optical disk drives, the control of the pick-up head is a fundamental and important issue. The control for radial movement of the pick-up head include a static tracking, a short seeking, and a long seeking (long jumping). Generally speaking, the long seeking operation often includes the following methods.(1) A stepping motor or a photo interrupter is used for identifying the actual position of the pick-up head to control the pick-up head afterwards. (2) An open loop method is used for controlling the pick-up head. (3) A velocity feedback method is used for controlling the pick-up head according to a track-crossing signal transferred from the pick-up head. In the method (1), the cost is higher, because of use of the stepping motors or the photo interrupter. In the method (2), high precision is required because of the influence of a mechanical variation. However, the method (3) is widely used for long seeking control of the pick-up head because of low cost and a great resistance to mechanical variation.

Please refer to FIG. 1, which is a schematic diagram of an optical disk drive 10 according to the prior art. The optical disk drive 10 comprises a sled 12 movably installed on the optical disk drive 10, a pick-up head 14 movably installed on the sled 12 for reading data stored on a optical disk 30, a first compensator 20 for controlling movement of the pick-up head 14 relative to the sled 12, and a second compensator 22 for controlling movement of the sled 12 relative to the optical disk drive 10. The pick-up head 14 moves within a seeking region 28. The first compensator 20 and the second compensator 22 control the pick-up head 14 and the sled 12 separately by a close-loop control, and therefore the pick-up head 14 moves with a desired velocity.

However, the structure shown in FIG. 1 for separately controlling the pick-up head 14 and the sled 14 may cause the pick-up head 14 to be out of a linear region. Please refer to FIG. 2(a) to FIG. 2(c) of prior art. FIG. 2(a) is a velocity response diagram of the pick-up head 14. FIG. 2(b) is a velocity response diagram of the sled 14. FIG. 2(c) is a relative velocity diagram of the pick-up head 14 and the sled 12. As shown in FIG. 2(a), the pick-up head 14 can reach a target velocity 32 quickly because of its lightweight. As shown in FIG. 2(b), the sled 12 needs a longer time to reach the target velocity 32 because of its heavy weight. Therefore, the relative velocity between the pick-up head 14 and the sled 12 is large as shown in FIG. 2(c). The pick-up head 14 maybe move to an edge of the seeking region 28 when the relative velocity between the pick-up head 14 and the sled 12 is too large. That is, the pick-up head 14 does not stay within a linear region of the seeking region 28 but enters into a non-linear region at the edge of the seeking region 28. This leads to bad control efficiency and a serious damage to components inside the optical disk drive 10, and the track-locking operation is negatively affected after tracking.

In order to solve the serious problem mentioned above, the prior art adopts a method of increasing the gain of the second compensator 22 shown in FIG. 1 for speeding up the response velocity of the sled 12. However, increasing the gain simultaneously generates a large variation, and greatly affects the precise control of the pick-up head 14.

SUMMARY OF INVENTION

It is therefore a primary objective of the claimed invention to provide a long seeking method with additional driving forces on the sled of the optical disk drive for decreasing the velocity response time of the sled and decreasing the relative velocity between the sled and the pick-up head.

Briefly, the claimed invention provides a long seeking method used in an optical disk drive. The optical disk drive comprises a sled movably installed on the optical disk drive, a pick-up head movably installed on the sled for accessing data stored in a plurality of tracks of a optical disk, and a controller for applying a velocity control force to the sled to move the pick-up head from an initial track of a seeking region of the optical disk drive to a target track of the seeking region according to a velocity profile. The seeking region comprises an acceleration region and a deceleration region. The velocity profile in the acceleration region increases and the velocity profile in the deceleration region decreases according to the moving direction of the pick-up head. The long seeking method comprises identifying a position of the pick-up head within the seeking region, applying a first driving force on the sled in addition to the velocity control force when the pick-up head is within the acceleration region, where the direction of the first driving force is the same as the moving direction of the pick-up head, and applying a second driving force on the sled in addition to the velocity control force when the pick-up head is within the deceleration region, where the direction of the second driving force is opposite to the moving direction of the pick-up head.

It is an advantage of the present invention that the long seeking method can increase the stability of the long seeking process and reduce the time needed for seeking a desired track.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
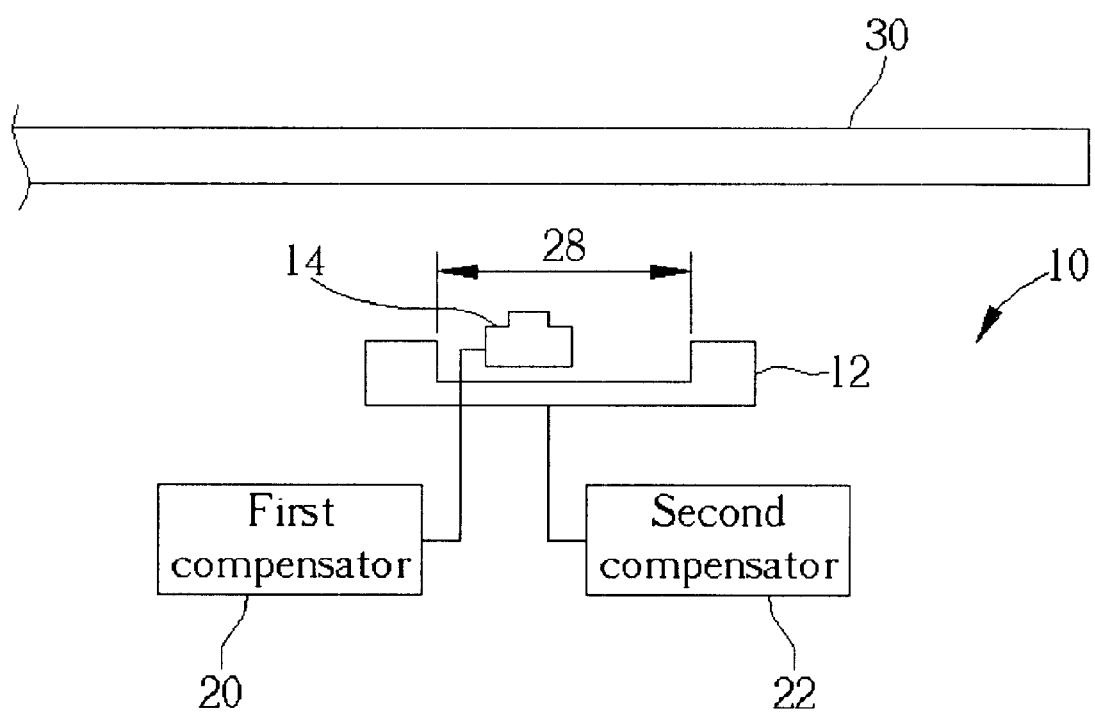
FIG. 1 is a schematic diagram of an optical disk drive according to the prior art.
Figure 2A:
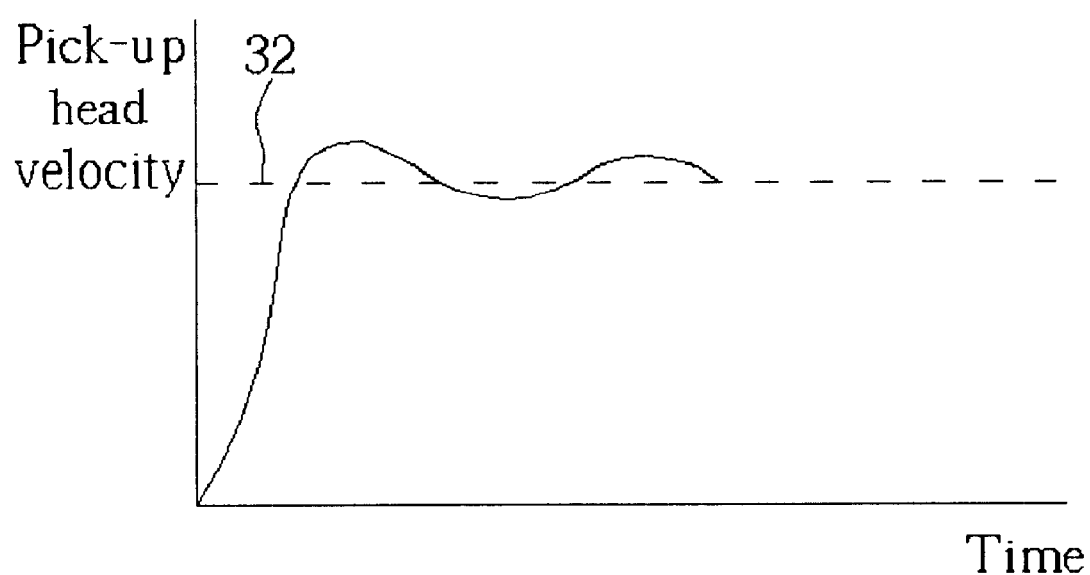
FIG. 2(a) is a velocity response diagram of the pick-up head shown in FIG. 1.
Figure 2B:
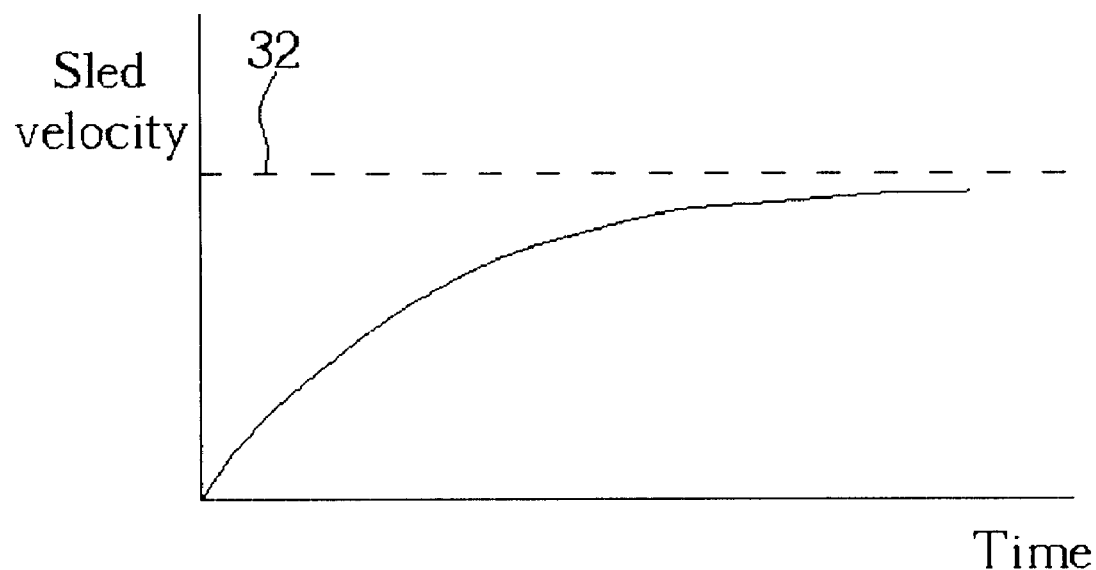
FIG. 2(b) is a velocity response diagram of the sled shown in FIG. 1.
Figure 2C:
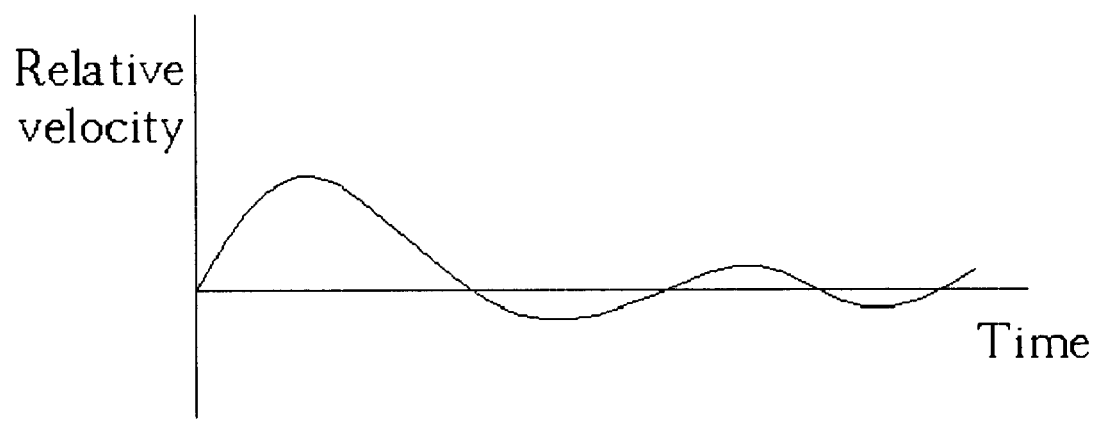
FIG. 2(c) is a relative velocity diagram of the pick-up head and the sled shown in FIG. 1.
Figure 3:
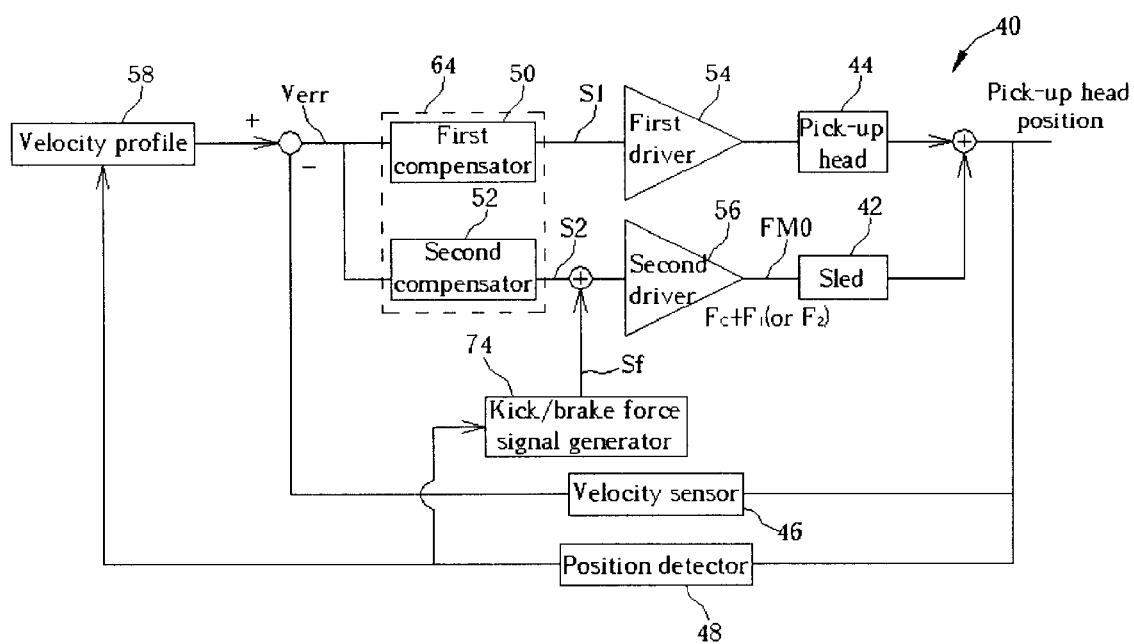
FIG. 3 is a schematic diagram of a control system in an optical disk drive according to the present invention.

Please refer to FIG. 3. FIG. 3 is a schematic diagram of a control system in an optical disk drive 40 according to the present invention. The optical disk drive 40 comprises a sled 42 moveably installed on the optical disk drive 40, a pick-up head 44 movably installed on the sled 42 for reading data stored on an optical disk (CD or DVD), a velocity sensor 46 for detecting a moving velocity of the pick-up head 44, a position detector 48 (for example, a track counter) for identifying a position of the pick-up head 44, and a controller 64 for controlling the pick-up head 44 and the sled 42 to move according to a velocity profile 58. The optical disk drive 40 further comprises a kick/brake force signal generator 74 for applying an additional driving force on the sled 42 according to the position of the pick-up head 44. The detail implementation of the kick/brake force signal generator 74 is further illustrated in FIG. 5 and FIG. 6.

As shown in FIG. 3, the controller 64 comprises a first compensator 50 and a second compensator 52. The first compensator 50 and the second compensator 52 are used for generating a first control signal S1 and a second control signal S2 separately according to a difference between the velocity profile 58 and the actual velocity of the pick-up head 44, that is, a velocity error signal Verr shown in FIG. 3. The optical disk drive 40 further comprises a first driver 54 connected to the first compensator 50 for driving the pick-up head 44 according to the first control signal S1, and a second driver 56 connected to the second compensator 52 for applying a velocity control force Fc on the sled 42 according to the second control signal S2. Moreover, the kick/brake force signal generator 74 generates a kick/brake force signal Sf to the second driver 56 so that the second driver 56 applies an additional driving force (F1 or F2) on the sled 42 in addition to the original velocity control force Fc.

Figure 4:
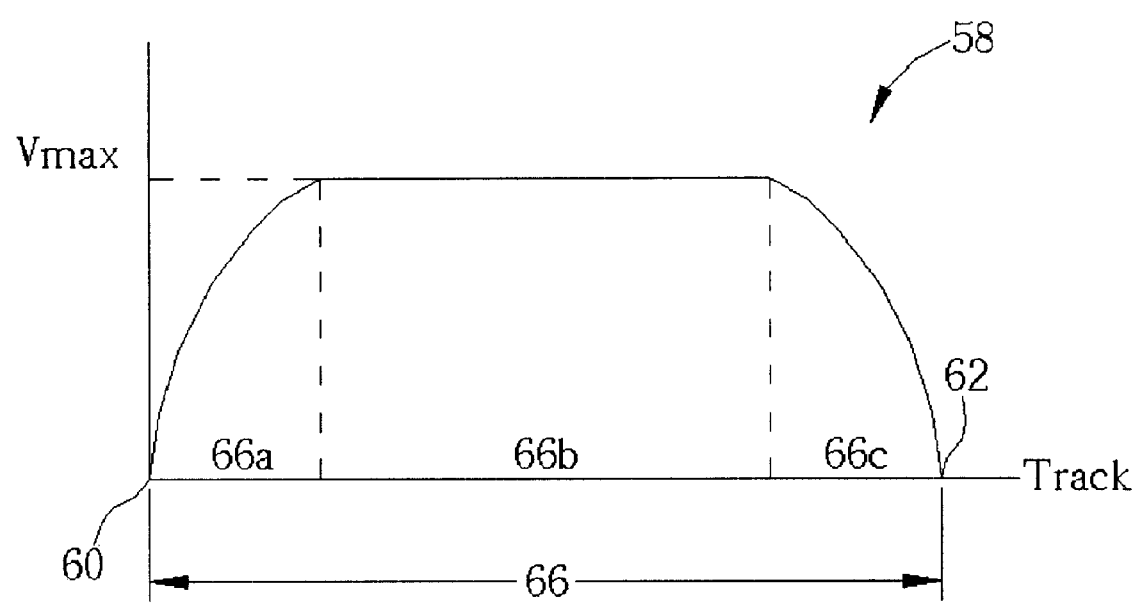
FIG. 4 is a diagram of the velocity profile shown in FIG. 3.

Please refer to FIG. 4, which is a diagram of the velocity profile 58 shown in FIG. 3. When the pick-up head 44 moves from an initial track 60 to a target track 62 within the seeking region 66, the controller 64 makes the pick-up head 44 move within the seeking region 66 according to the velocity profile 58 shown in FIG. 4. The seeking region 66 comprises an acceleration region 66a, a constant region 66b, and a deceleration region 66c. When the pick-up head 44 moves from the initial track 60 to the target track 62, the pick-up head 44 passes through the acceleration region 66a, the constant region 66b, and the deceleration region 66c in order. As shown in FIG. 4, the velocity profile 58 within the acceleration region 66a increases with the moving direction of the pick-up head 44. The velocity profile 58 is fixed within the constant region 66b. The velocity profile 58 within the deceleration region 66c decreases relative to the moving direction of the pick-up head 44. That is, the controller 64 applies the velocity control force Fc on the sled 42 by a close-loop velocity control for forcing the pick-up head 44 to move according to the velocity profile 58.

Figure 5:
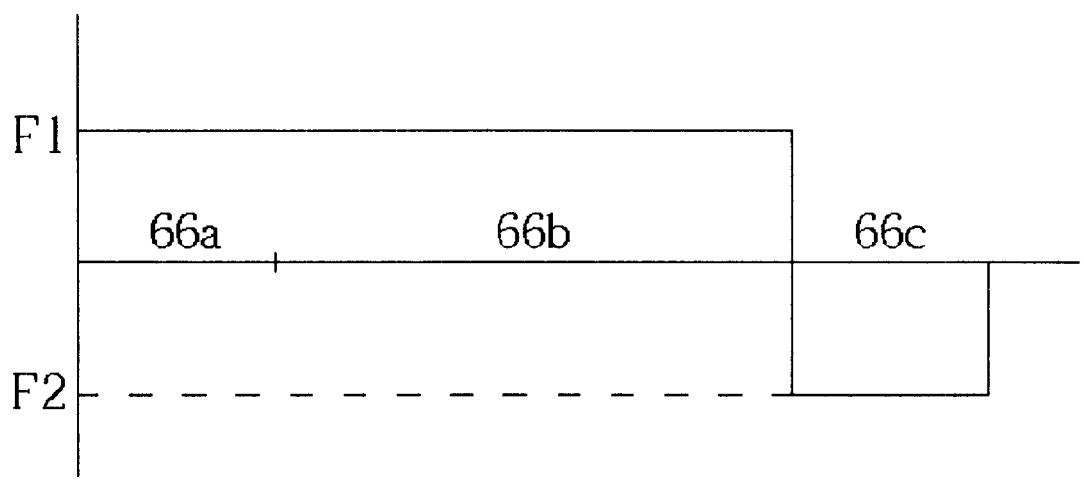
FIG. 5 is an operation diagram of the kick/brake force signal generator shown in FIG. 3.

Please refer to FIG. 5, which is an operation diagram of the kick/brake force signal generator 74 shown in FIG. 3. As shown in FIG. 3 and FIG. 5, the kick/brake force signal generator 74 applies an additional driving force (F1 or F2) on the sled 42 shown in FIG. 3 according to the result of the position detector 48. The position detector 48 identifies the position of the pick-up head 44 within the seeking region 66 (the acceleration region 66a, the constant region 66b, or the deceleration region 66c), and generates a corresponding result. As shown in FIG. 5, when the pick-up head 44 is positioned within the acceleration region 66a and the constant region 66, the kick/brake force signal generator 74 applies a first driving force F1 (kick force) on the sled 42 through an open-loop control in the same direction as the moving direction of the pick-up head 44. When the pick-up head 44 is positioned within the deceleration region 66c, the kick/brake force signal generator 74 applies a second driving force F2 (brake force) on the sled 42 through an open-loop control in opposite direction to the moving direction of the pick-up head 44. With the help of the closed-loop velocity control and the open-loop driving force control, the transient response of the sled 42 on accelerating and decelerating is improved so as to reduce the relative velocity between the pick-up head 44 and the sled 42.

Figure 6A:
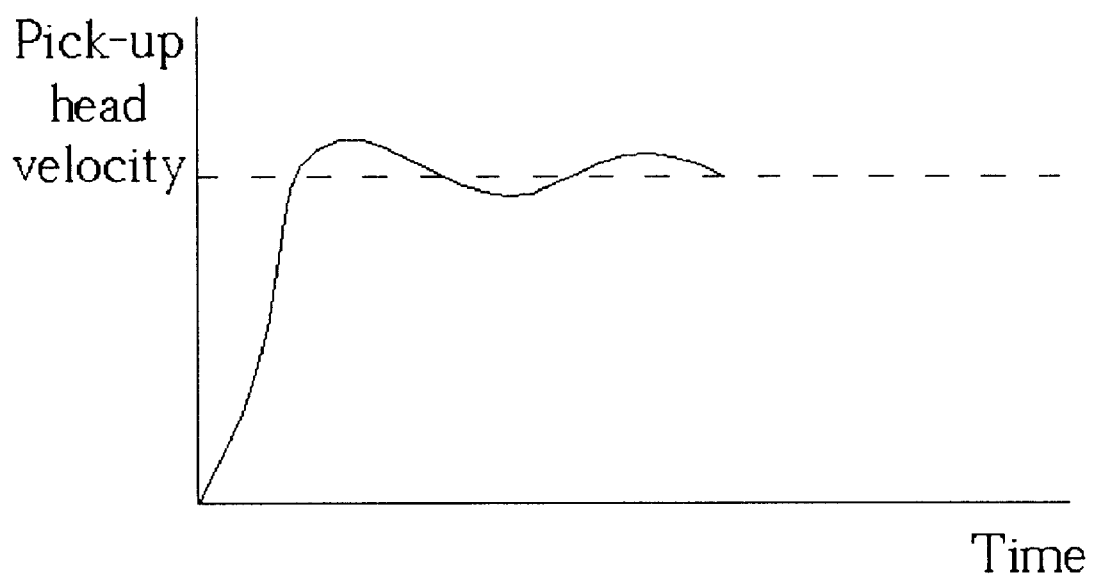
FIG. 6(a) is a velocity response diagram of the pick-up head shown in FIG. 3.
Figure 6B:
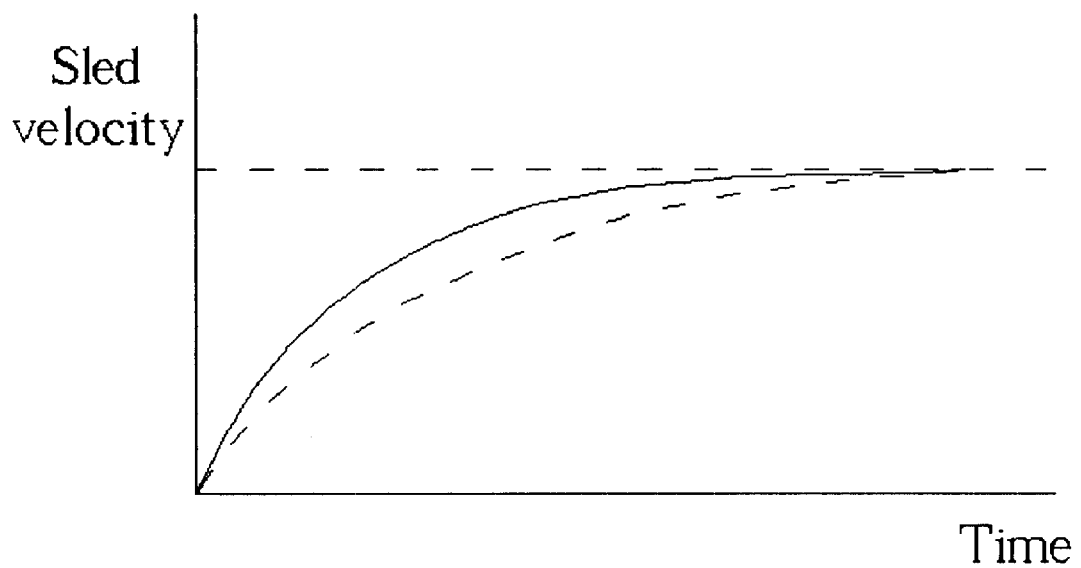
FIG. 6(b) is a velocity response diagram of the sled shown in FIG. 3.
Figure 6C:
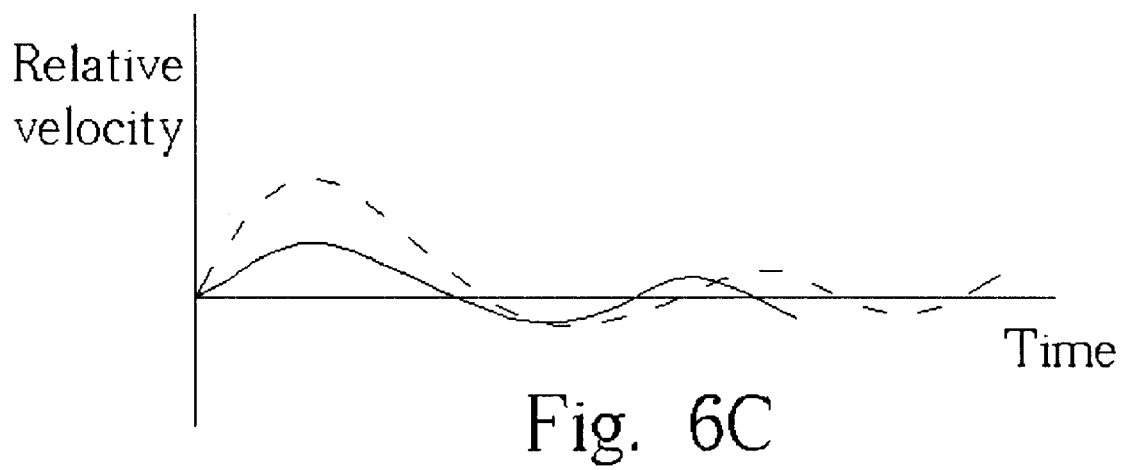
FIG. 6(c) is a relative velocity diagram of the sled and the pick-up head shown in FIG. 3.

Please refer to FIG. 6(a) through FIG. 6(c). FIG. 6(a) is a velocity response diagram of the pick-up head 44 shown in FIG. 3. FIG. 6(b) is a velocity response diagram of the sled 42 shown in FIG. 3. FIG. 6(c) is a relative velocity diagram of the sled 42 and the pick-head 44 shown in FIG. 3. As shown in FIG. 6(b), the response is improved compared with the prior control system because an additional driving force F1 or F2 is used. As shown in FIG. 6(c), the relative velocity between the sled 42 and the pick-up head 44 is reduced, and therefore, the probability of the pick-up head 44 entering into the non-linear region located at the edge of the seeking region 66 is lowered. Therefore, the long seeking control becomes more stable.

Figure 7:
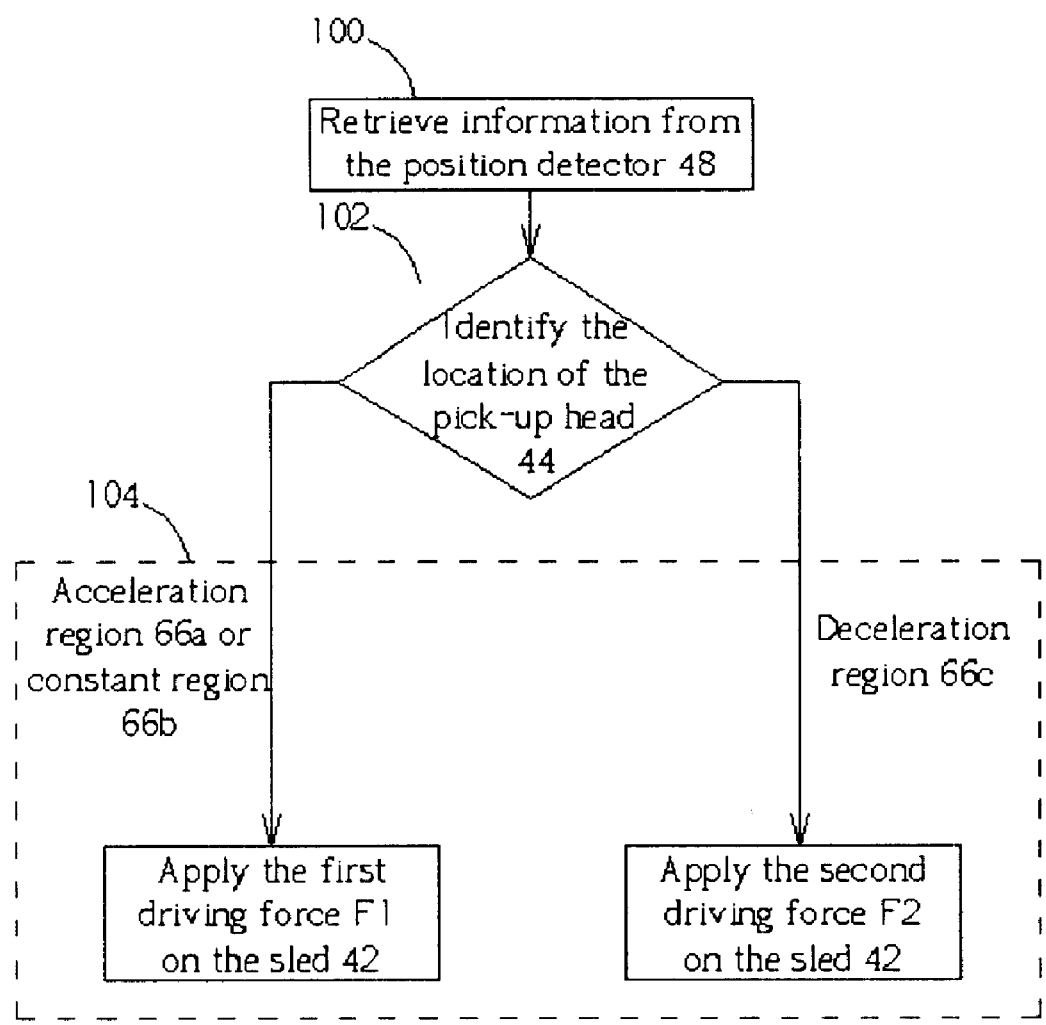
FIG. 7 is a flow chart of the long seeking method according to the present invention.

Please refer to FIG. 7, which is a flow chart of the long seeking method according to the present invention. The long seeking method according to the present invention comprises the following steps.

Step 100: The position detector 48 detects the position of the pick-up head 44.

Step 102:

The region where the pick-up head 44 is positioned (the acceleration region 66a, the constant region 66b, and the deceleration region 66c) is identified.

Step 104:

A first driving force F1 is applied on the sled 42 when the pick-up head 44 is within the acceleration region 66a or the constant region 66b, wherein the direction of the first driving force F1 is the same as the moving direction of the pick-up head 44. A second driving force F2 is applied on the sled 42 when the pick-up head 44 is within the deceleration region 66c, wherein the direction of the second driving force F2 is opposite to the moving direction of the pick-up head 44.

The response is improved and the relative velocity between the pick-up head 44 and the sled 42 is reduced. The probability of the pick-up head 44 entering into the non-linear region located at the edge of the seeking region 66 is greatly reduced. Moreover, the long seeking method according to the present invention can bear the rapid velocity changes of the velocity profile 58 and a higher maximum velocity (Vmax) of the velocity profile 58. Consequently, the time needed for seeking a desired track is greatly reduced because the rapid velocity changes and the higher maximum velocity (Vmax) of the velocity profile 58 can be achieved without any increase of the relative velocity between the pick-up head 44 and the sled 42.

Of course, the driving force imposed within the constant region 66b does not need to be the same as the driving force imposed within the acceleration region 66a. The long seeking method also can apply a third driving force different from the first driving force F1 on the sled 42. As long as the driving force (the kick force or the brake force) with a specific direction is correctly applied according to the acceleration and the deceleration of the velocity profile 58. Any magnitude of force is suitable for use under the present invention.

Figure 8:
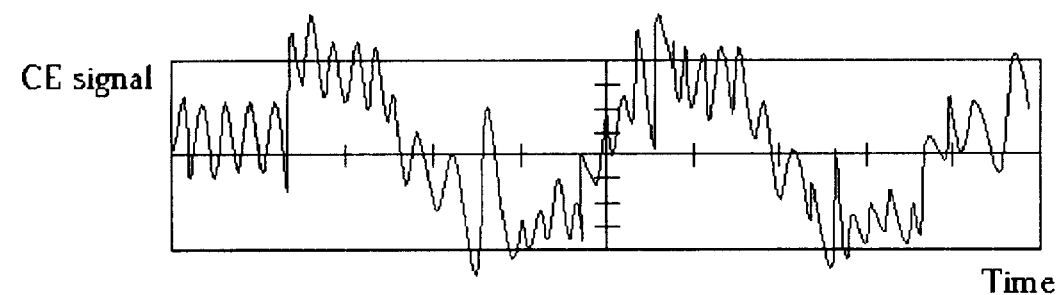
FIG. 8 is an experiment result diagram of a prior velocity feedback control.
Figure 8:
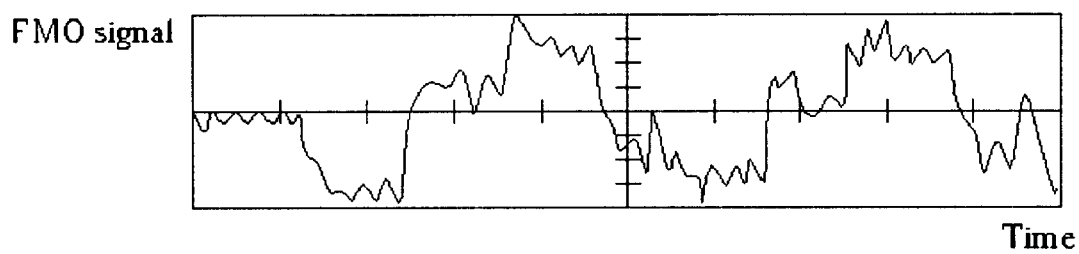
Figure 9:
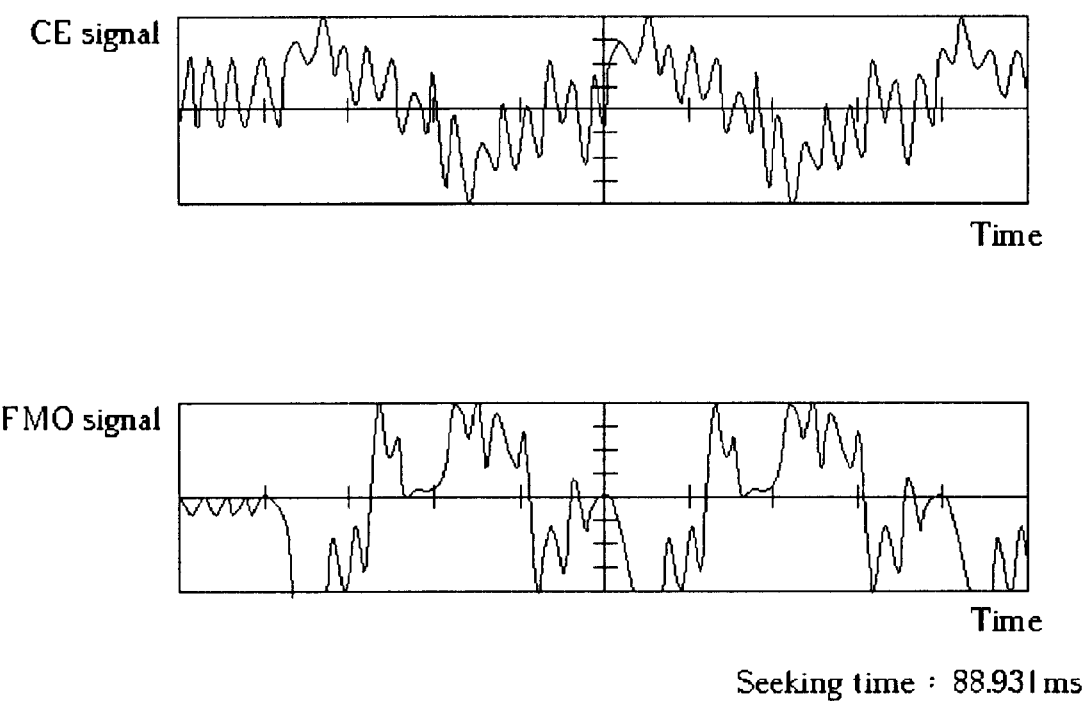
FIG. 9 is an experiment result diagram of the prior velocity feedback control with an increased gain.
Figure 10:
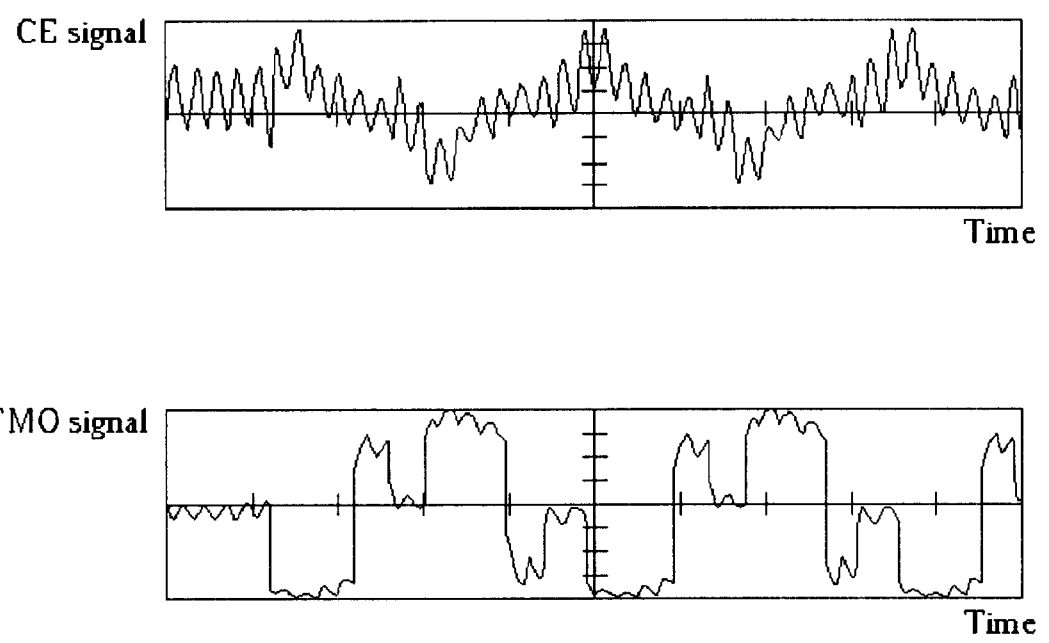
FIG. 10 is an experiment result diagram of the long seeking method according to the present invention.

(1) Please refer from FIG. 8 to FIG. 10. FIG. 8 is an experiment result diagram of a prior velocity feedback control. FIG. 9 is an experiment result diagram of the prior velocity feedback control with an increased gain. FIG. 10 is an experiment result diagram of the long seeking method according to the present invention. In FIG. 8 to FIG. 10, the signal CE stands for the deviation of the pick-up head 44 relative to the sled 42, and the signal FMO stands for a total driving force generated from the second driver 56. The experimental result was derived from the following conditions: Optical disk: with an eccentricity of 140 μm.

(2) Environment: a 50× optical disk drive working at 4800 R.P.M.

(3) Program: long seeking with 10000 tracks for changing seeking direction at every 10 ms.

As shown in FIG. 8, larger amplitudes of signal CE represent a larger deviation of the pick-up head 44 relative to the sled 42 so the whole system is unstable under the prior velocity feedback control. Moreover, the seeking time is equal to 97 ms approximately.

As shown in FIG. 9, when the gain of the second compensator 22 is increased by a factor of 2.5, the deviation of the pick-up head 44 relative to the sled 42 is reduced because of small amplitude of the signal CE. Moreover, the seeking time is improved to approximately 88 ms. But, the system still has following drawbacks.

(1) According to the output of the driving force (the signal FMO), increasing the gain introduces disturbance into the original driving force because of the eccentricity of the optical disk.

(2) The seeking time is not optimal, and the seeking time is not further reduced even with a greater gain.

(3) If the rotation speed is further increased or the gain is further increased, the agitation generated from the rapid change of the driving force is more serious than before.

As shown in FIG. 10, in the present invention, the pick-up head 44 is deviated less than prior art according to the signal CE. Because the present invention uses a velocity feedback control plus an open-loop kick/brake force, the seeking time is approximately equal to 83 ms. Furthermore, the agitation generated due to the eccentricity of the optical disk is not introduced to the driving force because the agitation of the signal FMO is smaller than that in FIG. 9. Therefore, the present invention can solve the deviation problem of the pick-up head 44 without introducing any additional interference, and achieve the goal of speeding up the operation of a long seeking process.

In order to make the system stable, the recommended principles of the of the kick/brake force signal Sf are as follows.

(1) The combination of the kick/brake force signal Sf and the second control signal S2 cannot make the signal FMO (the total driving force generated from the second driver 56) equal to or exceed the allowable value.

(2) The balance between the first driving force F1 and the second driving force F2 must be taken into consideration. The first driving force F1 and the second driving force F2 must be adjusted to adequate values respectively. If the first driving force F1 is too large, the pick-up head 44 cannot keep up with the sled correctly and the relative velocity will be unacceptable. If the second driving force F2 is too large, the sled decelerates too quickly for the pick-up head 44 and the relative velocity will be unacceptable. The kick/brake force signal Sf in FIG. 5, furthermore, includes two sectors (for example, F1, F2), but it is only one embodiment of the kick/brake force signal Sf. The kick/brake force signal Sf can comprise a plurality of sectors which have different magnitudes, and timings, etc.

In contrast to the prior long seeking method, the long seeking method according to the present invention applies an additional kick force F1 or brake force F2 on the sled 42 in addition to the original driving force. In the invention, not only the deviation problem of the pick-up head 44 is solved, but also the unnecessary agitation is averted. The long seeking process becomes more stable for allowing the velocity profile to permit a faster velocity change and a higher moving velocity (Vmax) of the pick-up head 44, further reducing the seeking time. The invention is suitable for optical disk drive, for example, CD-ROM (compact-disk read-only-memory) drive, CD-RW (re-writable CD) drive, DVD-ROM (digital versatile disk read-only-memory) drive, and the like.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A long seeking method used in an optical disk drive, the optical disk drive comprising:

a sled;

a pick-up head on the sled for accessing data stored in a plurality of tracks of an optical disk; and a controller for applying a velocity control force to the sled so as to move the pick-up head from an initial track of a seeking region of the optical disk to a target track of the seeking region according to a velocity profile, the seeking region comprising an acceleration region and a deceleration region, wherein the velocity profile in the acceleration region increases according to a moving direction of the pick-up head and the velocity profile in the deceleration region decreases;

the long seeking method comprising:

identifying a position of the pick-up head within the seeking region;

applying a first driving force on the sled in addition to the velocity control force when the pick-up head is within the acceleration region, wherein a direction of the first driving force is the same as the moving direction of the pick-up head; and applying a second driving force on the sled in addition to the velocity control force when the pick-up head is within the deceleration region, wherein a direction of the second driving force is opposite to the moving direction of the pick-up head.

2. The long seeking method of claim 1, wherein the controller uses a close-loop velocity control for applying the velocity control force on the sled to drive the pick-up head according to the velocity profile, and uses a open-loop velocity control for applying the first driving force and the second driving force on the sled.

3. The long seeking method of claim 1, wherein the seeking region further comprises a constant region with a fixed velocity profile, and the pick-up head sequentially passes through the acceleration region, the constant region and the deceleration region in moving from the initial track to the target track;

the long seeking method further comprising:
applying a third driving force on the sled in addition to the velocity control force when the pick-up head is within the constant region, wherein a direction of the third driving force is the same as the moving direction of the pick-up head.

4. The long seeking method of claim 3, wherein a magnitude of the third driving force is the same as a magnitude of the first driving force.

5. An optical disk drive comprising:
a sled;
a pick-up head on the sled for accessing data stored in a plurality of tracks of an optical disk;
a controller for applying a velocity control force to the sled so as to move the pick-up head from a initial track of a seeking region of the optical disk to a target track of the seeking region according to a velocity profile, the seeking region comprising an acceleration region and a deceleration region, wherein the velocity profile in the acceleration region increases according to a moving direction of the pick-up head and the velocity profile in the deceleration region decreases;
a position detector for identifying the position of the pick-up head within the seeking region; and
a kick/brake force signal generator connected to the position detector for applying a first driving force on the sled when the pick-up head is within the acceleration region and applying a second driving force on the sled when the pick-up head is within the deceleration region, wherein a direction of the first driving force is the same as the moving direction of the pick-up head and a direction of the second driving force is opposite to the moving direction of the pick-up head.

6. The optical disk drive of claim 5, wherein the controller uses a close-loop velocity control for applying the velocity control force on the sled so that the pick-up head moves according to the velocity profile, and uses a open-loop velocity control for applying the first driving force and the second driving force on the sled.

7. The optical disk drive of claim 5, wherein the controller comprises:
a velocity sensor for detecting a moving velocity of the pick-up head;
a first compensator for generating a first control signal according to a difference between the velocity profile and the moving velocity of the pick-up head so as to control a movement of the pick-up head relative to the sled; and
a second compensator for generating a second control signal according to a difference between the velocity profile and the moving velocity of the pick-up head so as to control a movement of the sled relative to the optical disk drive.

8. The optical disk drive of claim 7, further comprising:
a first driver connected to the first compensator for driving the pick-up head according to the first control signal; and
a second driver connected to the second compensator for driving the sled according to the second control signal.

9. The optical disk drive of claim 8, wherein the kick/brake force signal generator sends a kick/brake force signal to the second driver for applying the first driving force and the second driving force on the sled.

10. The optical disk drive of claim 5, wherein the seeking region further comprises a constant region with a fixed velocity profile, and the pick-up head sequentially passes through the acceleration region, the constant region, and the deceleration region in moving from the initial track to the target track; and when the pick-up head is within the constant region, the kick/brake force signal generator applies a third driving force on the sled in addition to the velocity control force, a direction of the third driving force being the same as the moving direction of the pick-up head.

11. The optical disk drive of claim 5, wherein a magnitude of the third driving force is the same as a magnitude of the first driving force.

12. A control circuit in an optical disk drive, the optical disk drive comprising: a sled; a pick-up head on the sled for accessing data stored in a plurality of tracks of an optical disk; the control circuit comprising:
a controller for applying a velocity control force to the sled for moving the pick-up head from a initial track of a seeking region to a target track of the seeking region according to a velocity profile, the seeking region comprising an acceleration region and a deceleration region, wherein the velocity profile in the acceleration region increases and the velocity profile in the deceleration region decreases;
a position detector for identifying the position of the pick-up head; and
a kick/brake force signal generator connected to the position detector for applying a first driving force on the sled when the pick-up head is within the acceleration region and applying a second driving force on the sled when the pick-up head is within the deceleration region, wherein a direction of the first driving force is the same as the moving direction of the pick-up head and a direction of the second driving force is opposite.

13. The control circuit of claim 12, wherein the controller uses a close-loop velocity control for applying the velocity control force on the sled so that the pick-up head moves according to the velocity profile, and uses a open-loop velocity control for applying the first driving force and the second driving force on the sled.

14. The control circuit of claim 12, wherein the controller comprises:
a velocity sensor for detecting a moving velocity of the pick-up head;
a first compensator for generating a first control signal according to a difference between the velocity profile and the moving velocity of the pick-up head so as to control a movement of the pick-up head relative to the sled; and
a second compensator for generating a second control signal according to a difference between the velocity profile and the moving velocity of the pick-up head so as to control a movement of the sled relative to the optical disk drive.

15. The control circuit of claim 14, further comprising:
a first driver connected to the first compensator for driving the pick-up head according to the first control signal; and
a second driver connected to the second compensator for driving the sled according to the second control signal.

16. The control circuit of claim 12, wherein the kick/brake force signal generator sends a kick/brake force signal to the second driver for applying the first driving force and the second driving force on the sled.

17. The control circuit of claim 12, wherein the seeking region further comprises a constant region with a fixed velocity profile, and the pick-up head sequentially passes through the acceleration region, the constant region, and the deceleration region in moving from the initial track to the target track; and when the pick-up head is within the constant region, the kick/brake force signal generator applies a third driving force on the sled in addition to the velocity control force, a direction of the third driving force being the same as the moving direction of the pick-up head.

18. The control circuit of claim 12, wherein a magnitude of the third driving force is the same as a magnitude of the first driving force.

* * * * *